(12) United States Patent
Sakata et al.

(10) Patent No.: US 6,377,388 B1
(45) Date of Patent: Apr. 23, 2002

(54) OPTICAL SIGNAL PROCESSOR

(75) Inventors: Haruhisa Sakata; Kosuke Nishimura; Masashi Usami; Munefumi Tsurusawa, all of Kamifukuoka (JP)

(73) Assignees: DDI Corporation; KDD Submarine Cable Systems Inc., both of Tokyo (JP)

( * ) Notice: Subject to any disclaimer, the term of this patent is extended or adjusted under 35 U.S.C. 154(b) by 0 days.

(21) Appl. No.: 09/717,466

(22) Filed: Nov. 20, 2000

(30) Foreign Application Priority Data

Nov. 19, 1999 (JP) .......................................... 11-329446

(51) Int. Cl.[7] ................................................ G02F 1/00
(52) U.S. Cl. ........................ 359/321; 359/245; 359/279; 359/322
(58) Field of Search ................................ 359/114, 115, 359/124, 127, 241, 244–248, 279, 321–322, 326–332; 356/450; 372/21–23, 26, 28; 385/1, 2, 4–5, 8–9, 14, 39–40, 129–132, 140

(56) References Cited

U.S. PATENT DOCUMENTS 5,777,778 A * 7/1998 Yao ............................ 359/245
5,959,764 A    9/1999 Edagawa et al. ............ 359/326
6,005,708 A   12/1999 Leclerc et al. ............... 359/326
6,035,078 A    3/2000 Dagens et al. ............... 385/14
6,081,631 A *  6/2000 Brindel et al. ................. 385/1
6,208,454 B1 * 3/2001 Koren et al. ................. 359/326

FOREIGN PATENT DOCUMENTS

EP            0 717 482        6/1996

* cited by examiner

*Primary Examiner*—Georgia Epps
*Assistant Examiner*—William Choi
(74) *Attorney, Agent, or Firm*—Christie, Parker & Hale, LLP (57) ABSTRACT

An optical signal processor is disclosed comprising a first optical path having a first electroabsorption optical modulator to be applied with a constant voltage and to absorb light of a signal wavelength, a second optical path having a fixed phase relation with the first optical path relative to a probe wavelength, a probe light introducer for dividing probe light of the probe wavelength into two portions and feeding them respectively into the first and second optical paths, an original signal light introducer for introducing original signal light of the signal wavelength into the first electroabsorption optical modulator, and a combiner for combining both light of the probe wavelength passed through the first and second paths.

14 Claims, 5 Drawing Sheets

FIG. 4 (a) Original signal light 12

FIG. 4 (b) Probe light 16

FIG. 4 (c) Converted signal light 20

FIG. 5

OPTICAL SIGNAL PROCESSOR

FIELD OF THE INVENTION

This invention relates to an optical signal processor, and more specifically, to an optical signal processor for processing a signal in an optical state in an optical network system, an optical switching system and so on.

BACKGROUND OF THE INVENTION

As an infrastructure for supporting the future information scene, a large capacity optical communication network using a wavelength division multiplexing system has been eagerly researched. In such present situation, a practical optical reproduction technology such as signal wavelength conversion and waveform shaping has been positively studied and examined, since the capacity of an optical network greatly improves if it is possible to reproduce a signal in an optical state at each node of the optical network.

In order to obtain such optical reproducer, the following configurations have been basically proposed; a configuration (cf. FIGS. 11 and 12 of the U.S. Pat. No. 5,959,764) employing the cross gain modulation and cross phase modulation of a semiconductor optical amplifier (SOA), a configuration (cf. e.g. FIG. 13 of the above-mentioned patent) utilizing four wave mixing of a semiconductor optical amplifier or an optical fiber, and a configuration (cf. e.g. FIG. 1 of the above-mentioned patent) using cross gain modulation of an electroabsorption (EA) optical modulator. Also, a configuration in which a semiconductor optical amplifier is disposed at each of two optical paths or arms of an interferometer configuration is disclosed in the U.S. Pat. Nos. 6,005,708 and 6,035,078 and EP 0717482.

In the foregoing conventional art, the one using the cross gain modulation of the semiconductor optical amplifier (SOA) has a simple configuration. However, this type is not suitable for multistage wavelength conversion since it is unable to produce converted light having a sufficiently high extinction rate. Furthermore, the gain recovery time takes several hundreds picoseconds and so it is not applicable to a high-speed signal of several Gb/s or more because the pattern effect becomes prominent.

The configuration, in which the two semiconductor optical amplifiers are disposed to compose a Mach-Zehnder interferometer structure, becomes complicated since original signal light must be input differentially when the high-speed is pursued. Also, this type has another problem that converted light is sensitively affected by only a slight power fluctuation of the original signal light since phase modulation of 180° can be performed with relatively low optical power.

Although the one utilizing the four wave mixing of a semiconductor optical amplifier operates at high-speed, its conversion wavelength band is narrow and S/N ratio is deteriorated due to spontaneous emission. When the four wave mixing is used, it is necessary, in principle, to equalize a polarization plane of original signal light with that of pumping light. The configuration of the surrounding optical elements, thus, becomes complicated causing the high production costs.

Although the wavelength converter employing the cross gain modulation of an electroabsorption optical modulator has the simplest configuration, this type demands relatively large original signal input light.

SUMMARY OF THE INVENTION

An object of the present invention is to solve the aforesaid problems in the conventional art and provide an optical signal processor for efficiently reproducing (wavelength converting and/or waveform shaping) a signal with a simple configuration.

Another object of the present invention is to provide an optical signal processor capable of obtaining a larger extinction rate.

Further object of the present invention is to provide an optical signal processor capable of shaping a signal waveform in an optical state.

An optical signal processor according to the invention is composed of a first optical path having an electroabsorption optical modulator which is applied with a constant voltage and absorbs light of a signal wavelength, a second optical path having a fixed phase relation with the first optical path relative to a probe wavelength, a probe light introducer for dividing probe light of the prove wavelength into two portions and feeding them respectively into the first and second optical paths, an original signal light introducer for introducing original signal light of the signal wavelength into the first electroabsorption optical modulator, and a combiner for combining both light of the probe wavelength passed through the first and second optical paths.

With this configuration, cross phase modulation occurs between the original signal light and the probe light in the first electroabsorption optical modulator, and the probe light is phase-modulated. Consequently, by combining the probe light propagated on the first and second optical paths, light (converted signal light) of the probe wavelength can be obtained which waveform varies at high-speed by following a waveform variation of the original signal light. Since the constant voltage is applied to the electroabsorption optical modulator, a carrier generated by the original signal light can be discharged toward the outside at high-speed. Hence, a high-speed response as fast as 10 Gb/s and more can be realized.

In the cross phase modulation of the electroabsorption optical modulator, since the intensity variation greater than that of the original signal light can be given to the combined probe light, the extinction rate is improved. Also, it is possible to give compression characteristics to the low intensity part and high intensity part of the original signal light, and therefore the noise can be suppressed and so the waveform is improved to have a steeper shape.

Preferably, the original signal light introducer introduces the original signal light into the first optical path so as to propagate in the opposite direction to the probe light in the first electroabsorption optical modulator. This configuration prevents that the remainder of the original signal light passed through the first electroabsorption optical modulator is mixed with the output light of the optical signal processor.

Preferably, one of the first and second optical paths has a phase shifter for adjusting the phase difference between the first and second optical paths relative to the probe wavelength into a predetermined value. With this configuration, desired characteristics can be obtained easily, and also an inverter operation can be selected.

Preferably, the second optical path has a second electroabsorption optical modulator having the same characteristics with those of the first electroabsorption optical modulator. With this configuration, it becomes easy to adjust or set the phase relation between the first and second optical paths.

An optical signal processor according to the invention is also composed of a first optical path having a first electroabsorption optical modulator, which is applied by a constant voltage and absorbs light of a signal wavelength, and a first reflector for reflecting a probe wavelength on one end of the first optical path, a second optical path having a fixed phase relation with the first optical path relative to the probe wavelength and having a second reflector for reflecting the probe wavelength on one end of the second optical path, an original signal light introducer for introducing original signal light of the signal wavelength into the first electroabsorption optical modulator, a combiner/divider for dividing probe light of the probe wavelength into two portions and feeding them respectively into the first and second optical paths as well as combining the two portions of light from the first and second optical paths, and a probe wavelength extracting filter for extracting the optical component of the probe wavelength from the combined output light of the combiner/divider.

With this configuration, it is also possible to obtain the same operation effect as a Michelson interferometer optical circuit.

Preferably, the original signal light introducer introduces the original signal light into the first optical path so as to enter the first electroabsorption optical modulator in the same direction with the probe light. With this configuration, the original signal light is absorbed while making roundtrips in the first electroabsorption optical modulator. Consequently, since the light intensity of the remained original signal light becomes considerably weak, harmful effects such as interference decrease.

Preferably, one of the first and second optical paths has a phase shifter for adjusting the phase difference between the first and second optical paths relative to the probe wavelength into a predetermined value. This configuration makes it possible to easily obtain desired characteristics. Also, an inverter operation can be selected.

Preferably, the first reflector is formed on one end face of the first electroabsorption optical modulator. This configuration makes it easier to produce and adjust the optical signal processor.

Preferably, the second optical path has a second electroabsorption optical modulator having the same characteristics with those of the first electroabsorption optical modulator. This configuration makes it easier to adjust or set the phase relation between the first and second optical paths.

Preferably, the second reflector is formed on one end face of the second electroabsorption optical modulator. This configuration makes it easier to produce and adjust the optical signal processor.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
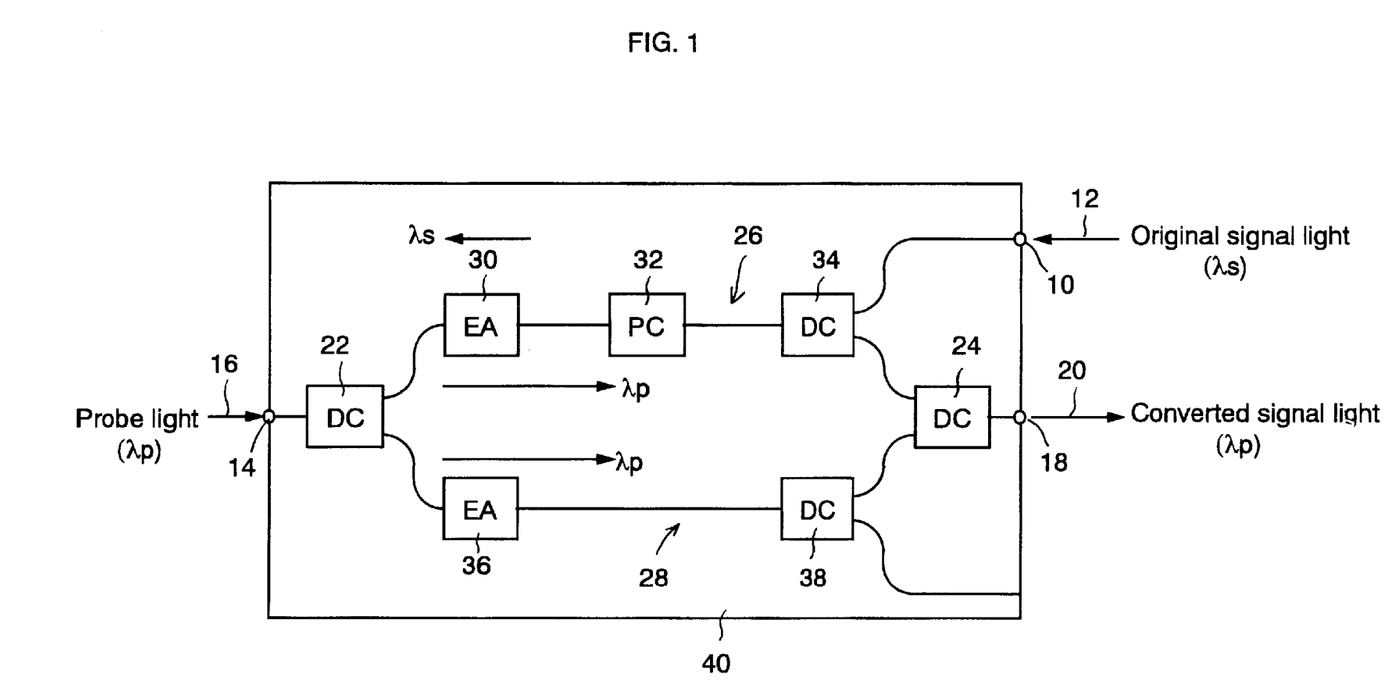
FIG. 1 shows a schematic diagram of a first embodiment according to the invention.

FIG. 1 shows a schematic block diagram of a first embodiment according to the invention. Reference numeral 10 denotes a signal input port to which original signal light 12 of a wavelength $\lambda s$ inputs, reference numeral 14 denotes a probe light input port to which probe light 16 of a wavelength $\lambda p$ inputs, and reference numeral 18 denotes a signal output port for outputting converted signal light 20 of the wavelength $\lambda p$ carrying the same data signal with the one that the original signal light 12 carries. The wavelength $\lambda p$ of the probe light 16 is generally different from the wavelength $\lambda s$; however it is also possible to be the same with the wavelength $\lambda s$. In this embodiment, $\lambda s$ is 1.51 $\mu$m and $\lambda p$ is 1.55 $\mu$m.

The probe light input port 14 is connected to a Y-branch 3-dB optical coupler (directional coupler) 22 which functions as an optical splitter, and the signal output port 18 is connected to a Y-branch optical coupler (directional coupler) 24 which functions as a combiner. Two optical paths (or arms) 26 and 28 are disposed between the two optical couplers 22 and 24. With this configuration, a Mach-Zehnder interferometer is formed.

An electroabsorption (EA) optical modulator 30, a phase shifter 32 and a Y-branch optical coupler (directional coupler) 34 are disposed in that order, from the optical coupler 22 side to the optical coupler 24. side, on the optical path 26. The optical coupler 34 is disposed so as to introduce the original signal light 12 from the signal input port 10 to the EA optical modulator 30 on the optical path 26 as well as feed the probe light, passed through the EA optical modulator 30 and phase shifter 32, into the optical coupler 24. The phase shifter 32 is composed of, for example, a thin film heater and capable of adjusting a phase of the light propagating on the optical path 26 with the heat.

On the other hand, an EA optical modulator 36 and a Y-branch optical coupler (directional coupler) 38 are disposed in that order, from the optical coupler 22 side toward the optical coupler 24 side, on the optical path 28. The EA optical modulator 36 and the optical coupler 38 (especially the optical coupler 38) are not essential since they are disposed only for the purpose of balancing the loss and phase between the probe light propagating on the optical path 28 and the probe light propagating on the optical path 26.

The EA optical modulators 30 and 36 are respectively composed of a waveguide transmission InGaAsP electroabsorption semiconductor optical modulator utilizing the Franz-Keldysh effect, and preset to be transparent to the wavelength $\lambda p$ (here, $\lambda p$ is 1.55 $\mu$m) of the probe light 16 and to absorb the wavelength $\lambda s$ (here, $\lambda s$ is 1.51 $\mu$m) of the original signal light 12. To put it concretely, each of the EA optical modulators 30 and 36 has a layer structure in which a 0.3 $\mu$m thick InGaAsP electroabsorption layer ($\lambda g$=1.40 $\mu$m), a 0.05 $\mu$m thick InGaAsP hole accumulation prevention layer ($\lambda g$=1.22 $\mu$m), a 0.05 $\mu$m thick InP cladding layer, a 2 $\mu$m thick p-InP cladding layer and a 0.1 $\mu$m thick p-InGaAsP contact layer ($\lambda g$=1.22 $\mu$m) are layered on a (100) n-InP substrate in this order, and also an iron doped InP is embedded in the structure.

In this embodiment, the optical couplers 22 and 24, the optical paths 26 and 28, the EA optical modulators 30 and 36, the phase shifter 32 and the optical couplers 34 and 38 are hybrid-integrated on a silica substrate 40.

The operation of the embodiment is described below. The EA optical modulators 30 and 36 are fed with a constant voltage of 3.0 volt. Also, the phase shifter 32 is preset so that the phase difference of the probe wavelength λp between the optical paths 26 and 28 becomes π in the condition that the original signal light 12 does not yet enter the signal input port 10. At this stage, to simplify the explanation, the probe light 16 is assumed as CW light.

The CW probe light 16 from the probe light input port 14 is divided into two portions by the optical coupler 22; one portion enters the EA optical modulator 30 on the optical path 26 and the other enters the EA optical modulator 36 on the optical path 28. As already mentioned, since the EA optical modulators 30 and 36 are transparent to the probe wavelength λp, the probe light transmits the EA optical modulators 30 and 36 with almost no loss. The phase shifter 32 adjusts the phase of the probe light passed through the EA optical modulator 30 and the optical coupler 34 divides the output light from the phase shifter 32 into two portions. The probe light attenuated by 3 dB at the optical coupler 34 enters the optical coupler 24. On the other hand, the probe light passed through the EA optical modulator 36 is divided into two portions by the optical coupler 38. The probe light attenuated by 3 dB at the optical coupler 38 enters the optical coupler 24. The optical coupler 24 combines the probe light from the optical coupler 34 and the probe light from the optical coupler 38. The combined output light of the optical coupler 24 is output as the converted signal light 20 from the signal light output port 18 toward the outside.

Since the phase difference of the probe light between the optical paths 26 and 28 are adjusted to become π by the phase shifter 32, the phase difference of the probe light entered the optical coupler 24 from the optical couplers 34 and 38 becomes π in the condition that the original signal light 12 does not yet enter the signal input port 10. So, the intensity of the light combined by the optical coupler 24, namely the intensity of the light (the converted signal light 20) of the probe wavelength λp output from the signal output port 14 becomes zero in principle (nearly zero in practice). on the other hand, in the condition that the original signal light 12 enters the signal input port 10, the original signal light 12 is introduced to the optical path 26 by the optical coupler 34, then transmits the phase shifter 32 and enters the EA optical modulator 30 in the opposite direction to the probe light. The EA optical modulator 30 absorbs the input original signal light. Owing to the absorption, a carrier is generated in the EA optical modulator 30, and so the effective refractivity at the waveguide part of the EA optical modulator 30 varies according to the intensity variation of the original signal light 12. The variation of the effective refractivity varies the phase of the probe light propagating in the EA optical modulator 30. That is, the cross phase modulation between the original signal light and the probe light occurs in the EA optical modulation 30. The carrier generated due to the absorption in the EA optical modulator 30 is sent to the outside circuit by the electric field, and thus this embodiment can respond at an ultrahigh speed. Even if the data rate of the original signal light 12 is 10 Gbit/s, this embodiment can sufficiently follow it.

Figure 2:
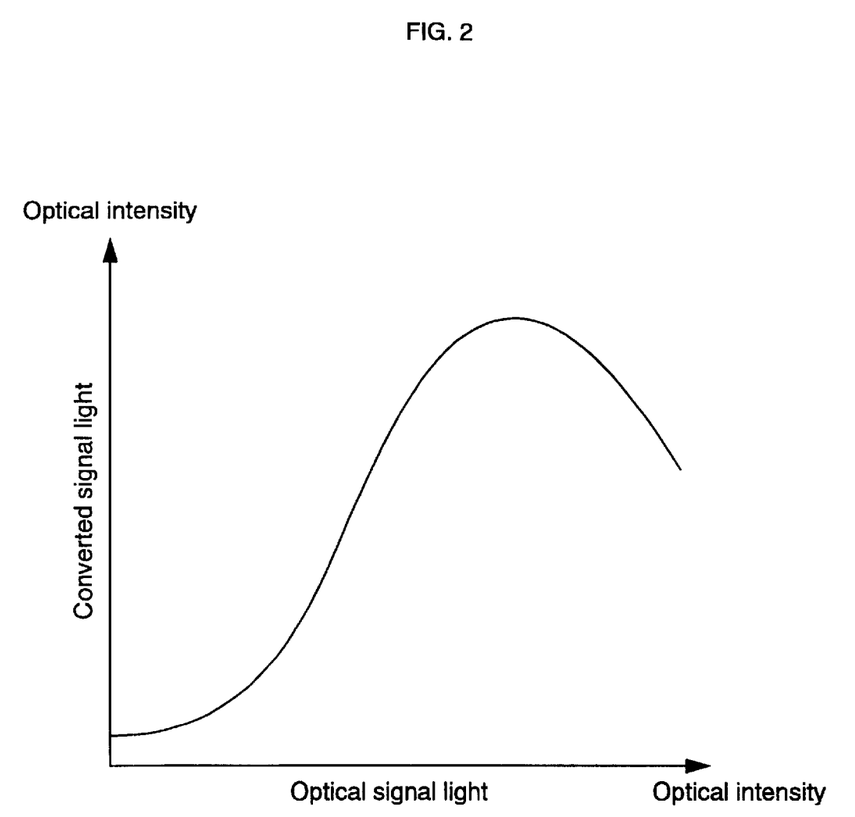
FIG. 2 shows characteristics of the embodiment in FIG. 1.

FIG. 2 shows a characteristic diagram of the embodiment when the CW probe light 16 of a predetermined optical intensity enters the probe light input port 14. In FIG. 2, the horizontal axis represents the optical intensity of the original signal light 12 and the vertical axis represents the intensity of the light (the converted signal light 20) of the probe wavelength λp output from the signal output port 18. Needless to say, the EA optical modulator 30 is set so as to give the phase variation of π to the probe light according to the estimated peak optical intensity of the original signal light 12.

Obviously from FIG. 2, the embodiment shown in FIG. 1 shows strong nonlinearity toward the optical intensity of the original signal light 12, more specifically, shows binary characteristics for compressing the parts with weak optical intensity and strong optical intensity of the original signal light 12 as well as stretching the parts with medium optical intensity. By utilizing those characteristics, it is possible to shape a waveform and compress a noise. Moreover, when the optical intensity of the original signal light 12 becomes stronger, the embodiment shown in FIG. 1 shows optical limiter characteristics wherein the optical intensity of the converted signal light is fixed even if the optical intensity of the original signal light 12 increases, and thereafter shows, as the optical intensity of the original signal light 12 becomes even stronger, negative characteristics wherein the optical intensity of the converted signal light 20 inversely becomes weaker.

Figure 3:
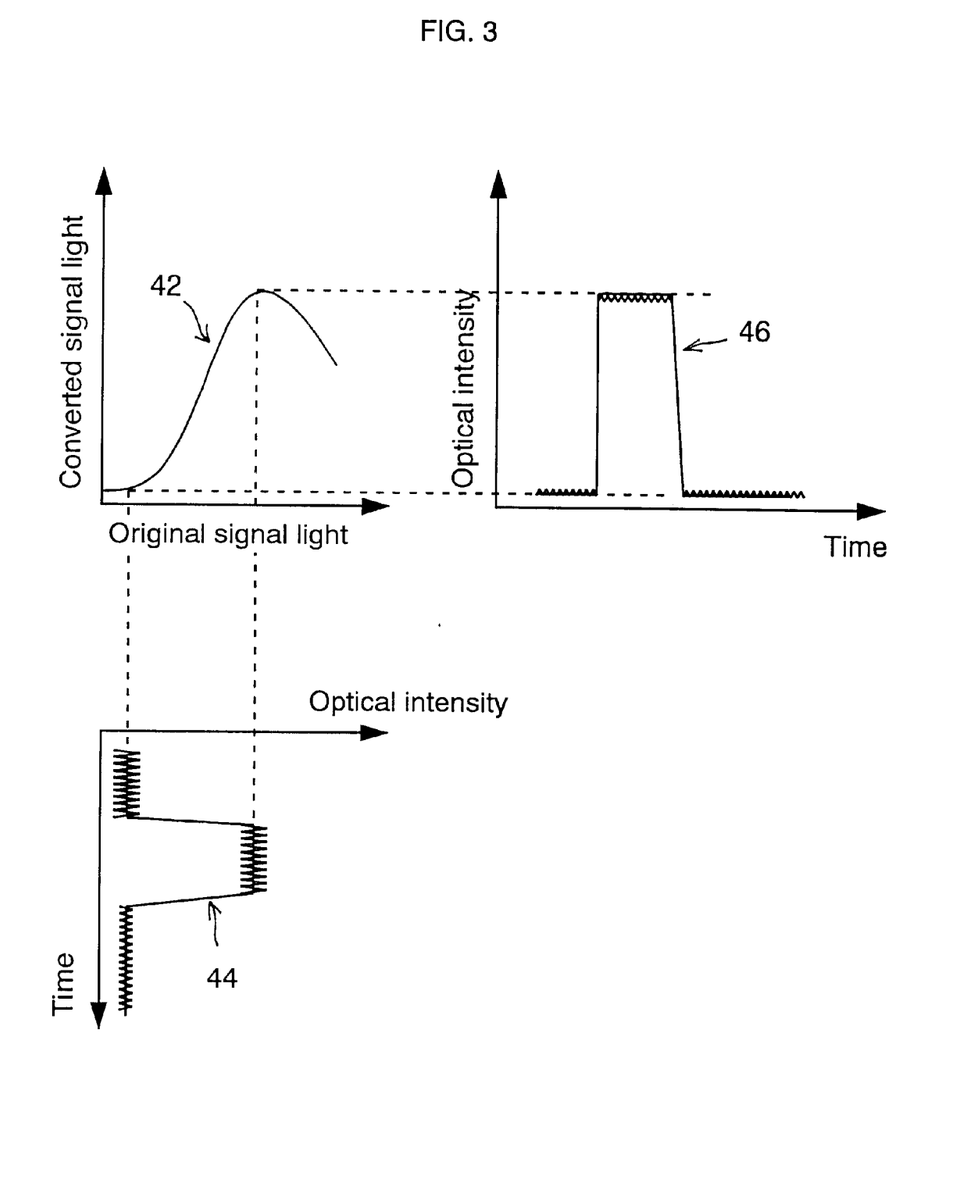
FIG. 3 shows an example of the waveform shaping effect according to the embodiment in FIG. 1.

FIG. 3 shows an example of the waveform shaping effect according to the embodiment in FIG. 1. Reference numeral 42 represents the input/output characteristics of the embodiment shown in FIG. 2, numeral 44 represents the waveform of the original signal light 12 entered the signal input port 10, and numeral 46 represents the waveform of the converted signal light 20 of the wavelength λp output from the signal output port 18. Obviously the waveform 46 of the converted signal light 20 is obtained by improving the waveform 44 of the original signal light 12 so as to change more drastically.

The embodiment shown in FIG. 1 works at the inverter operation when the phase difference between the optical paths 26 and 28 relative to the probe wavelength λp is adjusted to become zero by the phase shifter 32 in the condition that the original signal light 12 does not yet enter. That is, the waveform of the converted signal light 20 is basically the inverted one of the signal waveform of the original signal light 12.

Figure 4:
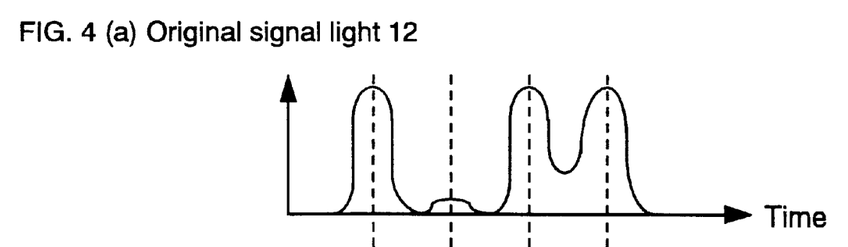
FIG. 4(a) shows a waveform of an original signal light 12 when a waveform of probe light 16 is an RZ pulse waveform.
FIG. 4(b) shows the RZ pulse waveform of the probe light 16.
FIG. 4(c) shows a waveform of converted signal light 20 when the waveform of the probe light 16 is the RZ pulse waveform.

By setting the waveform of the probe light 16 to be an RZ pulse waveform synchronized with the pulse waveform of the original signal light 12, the signal waveform is more improved and thus the S/N ratio is also improved. FIGS. 4($a$), 4($b$) and 4($c$) show the waveforms of the original signal light 12, the probe light 16 and the converted signal light 20 respectively. In FIGS. 4($a$), 4($b$) and 4($c$), the horizontal axis and the vertical axis express time and optical intensity respectively. It is known from FIG. 4 that, in the original signal light 12, the overlap of adjacent optical pulses and the pulse-like noise at the part where any optical pulse does not exist are removed, and the pulse wave forms are reshaped. Also, the S/N ratio is improved.

Furthermore, by setting the probe light 16 to be pulse light having a specific pulse pattern, it becomes possible to extract or remove a specific time slot part of the original signal light 12.

In the embodiment shown in FIG. 1, to make it easily understandable, the EA optical modulators 30 and 36 are disposed on the optical paths 26 and 28 respectively. However, in principle, it is sufficient that the EA optical modulator 30 is disposed on the optical path 26 alone. Also, when the optical couplers 34 and 38 are composed of wavelength multiplexing optical couplers corresponding to the optical signal wavelength λs and probe wavelength λp, the 3 dB loss owing to each of the demultiplexing of the probe wavelength λp and the multiplexing of the optical signal wavelength λs can be solved.

In the foregoing explanation, although the probe wavelength λp is defined as a wavelength that is not absorbed by the EA optical modulators 30 and 36, there is no difficulty for the operation in principle even if the wavelength is absorbed to a certain extent. In this case, however, the inverter operation is not suitable since the loss becomes larger and the interference circuit becomes asymmetry when the wavelength λp is absorbed.

In the embodiment, each component is hybrid-integrated on the InP substrate; however, it is also possible to realize the structure with optical fiber components having almost the same functions.

Also, although a waveguide InGaAsP electroabsorption type optical modulator of Franz-Keldysh effect is used as the EA optical modulator in the embodiment, any other absorption type optical modulator is applicable to the invention as far as it has the function for forcibly discharging, faster than the thermal diffusion, electrons and/or holes generated in the optical modulator due to the absorption by using an electric field formed in the optical modulator out of a voltage fed into the optical modulator. For example, waveguide type MQW optical modulators using the quantum Stark effect of multiquantum wells (MQW) of semiconductors can be used.

As already explained referring to FIG. 3, since the embodiment has nonlinear characteristics between the optical amount of the original signal light 12 and that of the converted signal light 20, it is also applicable to optical waveform shaping. That is, the embodiment has optical threshold characteristics in which the optical intensity of the converted signal light 20 becomes drastically stronger relative to that of the original signal light. Also, the embodiment has an optical limiter function in which the optical output level of the converted signal light 20 is limited when the optical intensity of the original signal light 12 is strong. Such nonlinear characteristics are effective to suppress strength of noise at a space level and a mark level of an intensity-modulated optical signal. When it is used for such purpose of noise control, the probe wavelength λp can be identical with the wavelength s of the original signal light 12.

Apparently, a similar operating effect can be obtained when the optical couplers 22, 24, 34 and 38 are respectively composed of an Y-shaped waveguide or a multimode interferometer (MMI) type optical combiner/splitter circuit. In such case, this embodiment can be formed on an InP substrate by using a semiconductor process technology; namely it can be obtained with a monolithic integrated structure. A semiconductor optical amplifier for amplifying the light of the wavelength λp also can be disposed between the optical coupler 24 and the signal output port 18.

It is also applicable to feed assist light into the signal input port 10 in order to adjust the absorption characteristics of the EA optical modulator 30 for the wavelength λs light. The wavelength of the assist light should be a wavelength, e.g. 1.52 μm, to be absorbed at the EA optical modulator 30. By adjusting the intensity of the assist light, it becomes possible to control the absorption characteristics of the EA optical modulator 30 for the wavelength λs light from the outside. That is, the cross phase modulation action between the original signal light and the probe light in the EA optical modulator 30 can be controlled from the outside.

In the embodiment, although the probe light 16 is sent from the outside, it is applicable to use an InP substrate instead of the silica substrate and form a semiconductor laser light source for generating the probe light 16 on the substrate. Needless to say, it is possible to use other substrates.

Figure 5:
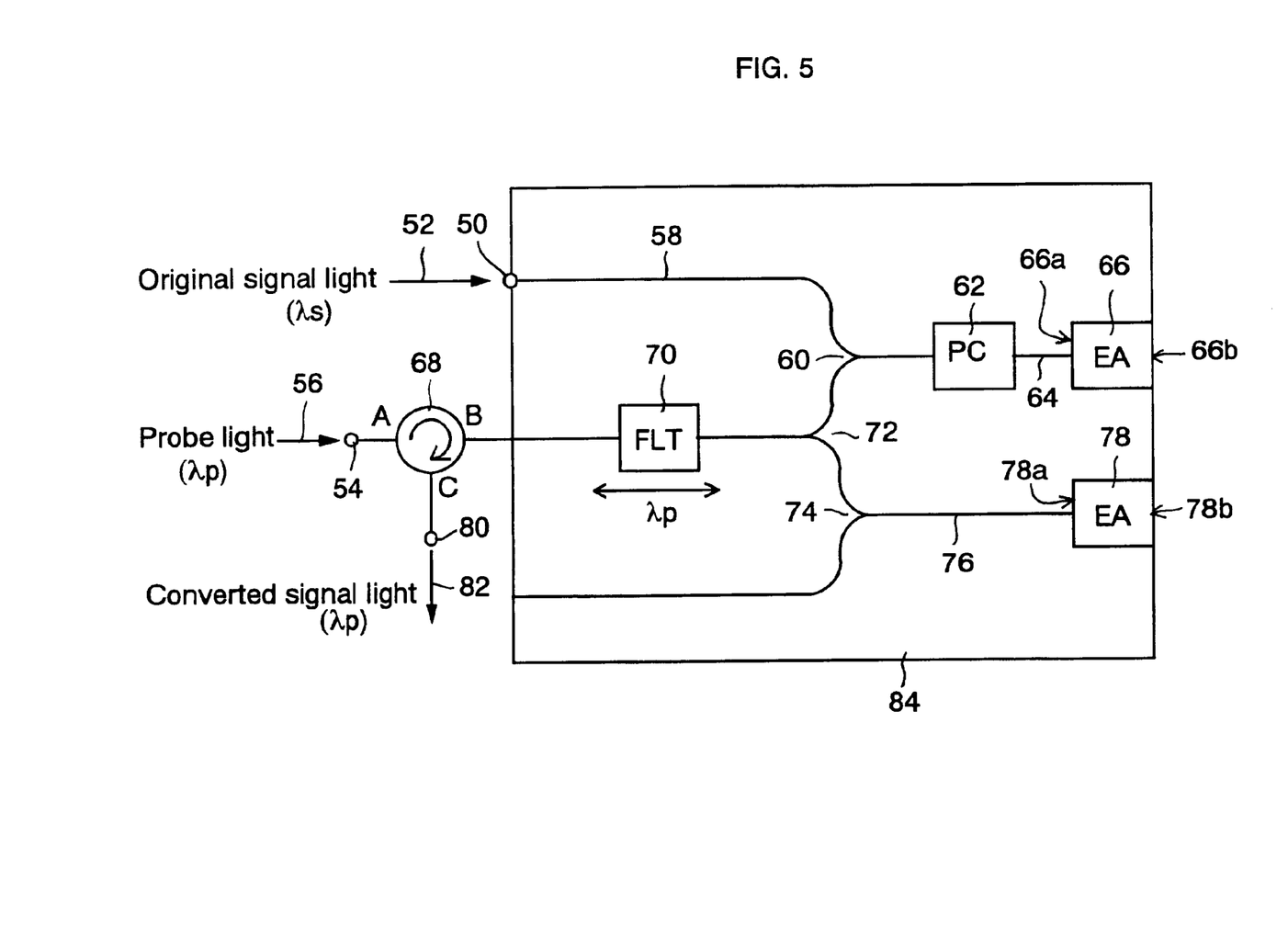
FIG. 5 shows a schematic diagram of a second embodiment according to the invention.

FIG. 5 shows a schematic block diagram of a second embodiment according to the invention. The embodiment employs a Michelson interferometer structure. Original signal light 52 of a wavelength λs (e.g. 1.52 μm) enters a signal input port 50, and CW probe light 56 of a wavelength λp (e.g. 1.55 μm) enters a probe light input port 54. In the embodiment, the original signal wavelength λs and the probe wavelength λp must be different from each other.

The original signal light 52 entered the signal input port 50 propagates a silica waveguide 58 and enters a phase shifter 62 via an Y-shaped branch line 60. The configuration and function of the phase shifter 62 are identical with those of the phase shifter 32 of the embodiment in FIG. 1. The original signal light passed through the phase shifter 62 propagates a silica waveguide 64 and enters an electroabsorption (EA) optical modulator 66. The EA optical modulator 66 is, for example, composed of a waveguide transmission InGaAsP electroabsorption semiconductor element with Franz-Keldysh effect, and the internal configuration is basically identical with that of the EA optical modulator 30 of the embodiment shown in FIG. 1. A constant voltage of 3.0 volt is applied to the EA optical modulator 66. The EA optical modulator 66 is composed of a medium that is almost transparent so as not to absorb the probe wavelength In the EA optical modulator 66, on an end face 66a side connecting to the silica waveguide 64, a region (not shown in the diagram) is formed for matching a spot-size of the light propagating on the silica waveguide 64 and that of the light propagating in the EA optical modulator 66. To put it concretely, the region reduces the stripe width of the electroabsorption layer as approaching to the end face 66a connecting to the silica waveguide 64, the stripe width is 1.5 μm in the EA optical modulator 66, and makes the stripe width to become 0.5 μm at the end face 66a. Also, a nonreflective coating is formed on the end face 66a for the original signal wavelength λs and probe wavelength λp. Although the coupling loss of the silica waveguide 64 and the EA optical modulator 66 is 6 dB when any spot size converter is not disposed, it is reduced to 4 dB when the above spot size converter is disposed.

An end face 66b on the opposite side of the EA optical modulator 66 is formed as a complete reflective surface for the probe wavelength λp. Although the end face 66b can completely reflect the original signal wavelength λs, the reflected light becomes an obstacle in that case.

The probe light 56 input the probe light input port 54 enters a port A of an optical circulator 68. The optical circulator 68 is an optical element for outputting the input light of the port A from a port B and outputting input light of the port B from a port C. The probe light output from the port B of the optical circulator 68 transmits an optical filter 70, which passes the probe wavelength λp through and does not pass the original wavelength λs, and enters an Y-shaped branch line 72 to be divided into two portions.

One portion of the probe light divided at the Y-shaped branch line 72 enters the EA optical modulator 66 through the Y-shaped branch line 60, the phase shifter 62, and the silica waveguide 64. On the other hand, the other portion of the probe light divided at the Y-shaped branch line 72 enters an EA optical modulator 78 through an Y-shaped branch line 74 and a silica waveguide 76. The EA optical modulator 78 has the same configuration with the EA optical modulator 66. That is, the EA optical modulator 78 has, on an end face 78a side connecting to the silica waveguide 76, a region (not shown in the diagram) for matching a spot-size of the light propagating on the silica waveguide 76 and that of the light propagating in the EA optical modulator 78. The same nonreflective coating used for the end face 66a is formed on the end face 78a, and the same reflective surface used for the end face 66b is formed on an end face 78b.

In the EA optical modulator 66, the probe light is reflected by the end face 66b and reenters the silica transmission line 64. However, in the EA optical modulator 66, cross phase modulation occurs between the original signal light 52 and the probe light 56 and the optical phase of the probe light 56 is influenced and varies with the optical intensity waveform variation of the original signal light 52. The probe light which phase is modulated at the EA optical modulator 66 transmits the silica waveguide 60 and the phase shifter 62 and is divided into two portions at the Y-shaped branch line 60. One portion of the probe light divided at the Y-shaped branch line 60 enters the Y-shaped branch line 72.

On the other hand, in the EA optical modulator 78, the probe light is reflected by the end face 78b, reenters the silica transmission line 76 and is divided into two portions by the Y-shaped branch line 74. One portion of the probe light divided at the Y-shaped branch line 74 enters the Y-shaped branch line 72.

Consequently, entered the Y-shaped branch line 72 are the probe light which made a roundtrip to the first optical path or arm composed of the Y-shaped branch line 60, the phase shifter 62, the silica waveguide 64 and the EA optical modulator 66 and the probe light which made a roundtrip to the second optical path or arm composed of the Y-shaped branch line 74, the silica waveguide 76 and the EA optical modulator 78. Similarly to the embodiment in FIG. 1, the phase shifter 62 is preset so that the phase difference of the probe wavelength $\lambda p$ between the first and second optical paths becomes $\pi$ in the condition that the original signal light 52 does not yet enter the signal input port 50. Accordingly, the combined output light intensity of the Y-shaped branch line 72 becomes practically zero owing to the interference when the original signal light 52 does not yet enter the signal input port 50. By setting the optical intensity of the original signal light 52 appropriate for cross phase modulation characteristics of the EA optical modulator 66, the waveform of the combined output light of the Y-shaped branch line 72 becomes a waveform that varies more steeply, while reducing noise light and reflecting the signal waveform of the original signal light 52. That is, the light output from the Y-shaped branch line 72 toward the optical filter 70 contains the light of the wavelength $\lambda p$, namely converted signal light, which carries the same signal with the original signal light 52. Since the light output from the Y-shaped branch line 72 toward the optical filter 70 contains the original signal wavelength $\lambda s$, the optical filter 70 is disposed for removing it.

The optical filter 70 extracts the converted signal light of the wavelength $\lambda p$ alone from the output light of the Y-shaped branch line 72 and feeds the extracted light into the port B of the optical circulator 68. The optical circulator 68 outputs the converted signal light from the optical filter 70 toward a signal output port 80 through the port C. Converted signal light 82 of the wavelength $\lambda p$ for carrying the same signal with the original signal light 62 is output from the signal output port 80 toward the outside.

In the embodiment in FIG. 5, the silica waveguide 58, the Y-shaped branch line 60, the phase shifter 62, the silica waveguide 64, the EA optical modulator 66, the optical filter 70, the Y-shaped branch lines 72 and 74, the silica waveguide 76 and the EA optical modulator 78 can be formed on a substrate 84.

Wavelength conversion characteristics of the embodiment shown in FIG. 5, more specifically the characteristics of optical intensity variation of the converted signal light 82 for the optical intensity of the original signal light 52 is basically the same with those (FIG. 2) of the embodiment shown in FIG. 1. Similarly to the embodiment shown in FIG. 1, by making the probe light 56 to be an optical pulse synchronized with the original signal light 52, it becomes possible to improve the shaping effect of a pulse waveform as well as effectively suppress the noise in the absence of a pulse. It is obvious that the inverter operation can be realized when the phase difference between the first and second optical paths are adjusted to become zero.

In the foregoing description, although the embodiment using a 1.5 $\mu$m band electroabsorption optical modulator is explained, the invention is not restricted to the wavelength band and optical element.

As readily understandable from the aforementioned, according to the invention, signal light can be reproduced in an optical state with a simple configuration. At the same time, it is possible to convert a wave length of the signal light. In principle, by optimizing an electroabsorption semiconductor element and an interferometer optical circuit, an extinction ratio larger than that of original signal light can be obtained. By adjusting the interferometer optical circuit, a signal waveform can be improved, e.g. elimination of the noise and so on, and also the optical phase distortion of the original signal light can be removed.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical signal processor comprising:
    a first optical path having a first electroabsorption optical modulator to be applied with a constant voltage and to absorb light of a signal wavelength;
    a second optical path having a fixed phase relation with the first optical path relative to a probe wavelength;
    a probe light introducer configured to divide probe light of the probe wavelength into two portions and feeding them respectively into the first and second optical paths;
    a signal light introducer configured to introduce signal light of the signal wavelength into the first electroabsorption optical modulator; and
    a combiner configured to combine both the probe lights of the probe wavelength passed through the first and second paths.

2. The optical signal processor of claim 1 wherein the signal light introducer is configured to introduce the signal light into the first optical path so as to propagate in an opposite direction to the probe light in the first electroabsorption optical modulator.

3. The optical signal processor of claim 1 wherein one of the first and second paths comprises a phase shifter configured to adjust a phase difference between the first and second paths relative to the probe wavelength into a predetermined value.

4. The optical signal processor of claim 1 wherein the first electroabsorption optical modulator comprises a spot size converting function.

5. The optical signal processor of claim 1 wherein the second path comprises a second electroabsorption optical modulator having the same characteristics with those of the first electroabsorption optical modulator.

6. The optical signal processor of claim 5 wherein the second electroabsorption optical modulator comprises a spot size converting function.

7. An optical signal processor comprising:

a first optical path having a first electroabsorption optical modulator to be applied with a constant voltage and to absorb light of a signal wavelength, and a first reflector configured to reflect a probe wavelength on one end of the first optical path;

a second optical path having a fixed phase relation with the first optical path for the probe wavelength, and a second reflector configured to reflect the probe wavelength on one end of the second optical path;

a signal light introducer configured to introduce signal light of the signal wavelength into the first electroabsorption optical modulator;

a combiner/divider configured to divide probe light of the probe wavelength into two portions, feeding them respectively into the first and second paths and combining the two portions of probe lights input from the first and second paths; and a probe wavelength extracting filter configured to extract an optical component of the probe wavelength from the combined output light from the combiner/divider.

8. The optical signal processor of claim 7 wherein the signal light introducer introduces the signal light into the first optical path so as to enter the first electroabsorption optical modulator in a same direction with the probe light.

9. The optical signal processor of claim 7 wherein one of the first and second paths comprises a phase shifter configured to adjust a phase difference between the first and second paths relative to the probe wavelength into a predetermined value.

10. The optical signal processor of claim 7 wherein the first reflector is formed on one end face of the first electroabsorption optical modulator.

11. The optical signal processor of claim 7 wherein the second path comprises a second electroabsorption optical modulator having the same characteristics with those of the first electroabsorption optical modulator.

12. The optical signal processor of claim 11 wherein the second reflector is formed on one end face of the second electroabsorption optical modulator.

13. The optical signal processor of claim 7 wherein the first electroabsorption optical modulator comprises a spot size converting function.

14. The optical signal processor of claim 11 wherein the second electroabsorption optical modulator comprises a spot size converting function.

* * * * *